United States Patent
Be'ery et al.

(10) Patent No.: US 11,818,228 B2
(45) Date of Patent: Nov. 14, 2023

(54) ESTABLISHING USER'S PRESENCE ON INTERNAL ON-PREMISES NETWORK OVER TIME USING NETWORK SIGNALS

(71) Applicant: Microsoft Technology Licensing, LLC., Redmond, WA (US)

(72) Inventors: Tal Arieh Be'ery, Petach Tikva (IL); Itai Grady, Ramat Hasharon (IL); Tom Jurgenson, Tel Aviv (IL); Idan Plotnik, Savion (IL); Sivan Krigsman, Hertzliya (IL); Michael Dubinsky, Tel Aviv (IL); Gil David, Zichron Yaakov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/273,594

(22) Filed: Sep. 22, 2016

(65) Prior Publication Data

US 2018/0084069 A1 Mar. 22, 2018

(51) Int. Cl.
*H04L 29/06* (2006.01)
*H04L 29/08* (2006.01)
(Continued)

(52) U.S. Cl.
CPC ............ *H04L 67/54* (2022.05); *G06F 21/316* (2013.01); *H04L 63/08* (2013.01); *H04L 67/52* (2022.05);
(Continued)

(58) Field of Classification Search
CPC ......... H04L 67/24; H04L 67/22; H04L 67/54; H04L 63/08; H04L 67/52; H04L 67/535;
(Continued)

(56) References Cited

U.S. PATENT DOCUMENTS 6,292,838 B1 * 9/2001 Nelson .............. H04L 29/12018
709/236
6,847,969 B1 * 1/2005 Mathai .................. G06Q 30/02
(Continued)

FOREIGN PATENT DOCUMENTS

CN 202584237 U 12/2012
CN 104680326 A 6/2015
(Continued)

OTHER PUBLICATIONS

"Design and Implementation of an Employee Monitoring System"—Shoewu et al, in Lasu Epe, Lagos State University, Feb. 2016 https://www.researchgate.net/publication/326493833_Design_and_Implementation_of_An_Employee_Monitoring_System_In_Lasu_Epe_Campus_Lagos_State_University (Year: 2016).*

(Continued)

*Primary Examiner* — Randy A Scott
(74) *Attorney, Agent, or Firm* — Wade IP Law PLLC

(57) ABSTRACT

Systems and methods for determining a user's presence on a network of an enterprise are provided. Traffic is collected to a network from devices and, over a period of time, login and logoff information from a user is determined from the collected network traffic. Network sessions are determined from a user's login and logoff information and timetable is generated specific to the user that contains the network sessions. The time table identifies when the user was active and when the user was not active based on the login and logoff information and, therefore, present at a particular location over a period of time.

20 Claims, 4 Drawing Sheets

(51) Int. Cl.
   *H04L 67/54* (2022.01)
   *H04L 9/40* (2022.01)
   *G06F 21/31* (2013.01)
   *H04L 67/52* (2022.01)
   *H04L 67/50* (2022.01)
   *G06F 21/33* (2013.01)

(52) U.S. Cl.
   CPC .......... *H04L 67/535* (2022.05); *G06F 21/335* (2013.01); *G06F 2221/2111* (2013.01); *H04L 63/083* (2013.01); *H04L 63/0807* (2013.01)

(58) Field of Classification Search
   CPC . H04L 63/0807; H04L 63/083; G06F 21/355; G06F 21/316
   USPC ........ 709/206, 207, 223, 224, 225; 726/2, 3, 726/4, 8
   See application file for complete search history.

(56) References Cited

U.S. PATENT DOCUMENTS

| | | | | |
|---|---|---|---|---|
| 8,838,486 | B2* | 9/2014 | Kong | G06Q 10/1091 705/32 |
| 9,070,162 | B2 | 6/2015 | Cherry et al. | |
| 2002/0145625 | A1* | 10/2002 | Komine | H04L 43/0811 715/738 |
| 2002/0175211 | A1 | 11/2002 | Dominquez et al. | |
| 2005/0089048 | A1* | 4/2005 | Chittenden | H04L 41/00 370/395.54 |
| 2007/0186106 | A1* | 8/2007 | Ting | H04L 63/0815 713/168 |
| 2007/0245420 | A1 | 10/2007 | Yong et al. | |
| 2008/0114683 | A1 | 5/2008 | Neveu et al. | |
| 2009/0132579 | A1* | 5/2009 | Kwang | H04L 67/22 |
| 2010/0052901 | A1 | 3/2010 | Szucs | |
| 2011/0185437 | A1 | 7/2011 | Tran et al. | |
| 2011/0258308 | A1 | 10/2011 | Arumugam et al. | |
| 2012/0278211 | A1 | 11/2012 | Loveland et al. | |
| 2013/0145004 | A1 | 6/2013 | Kumhyr | |
| 2014/0025546 | A1 | 1/2014 | Seng et al. | |
| 2015/0006695 | A1* | 1/2015 | Gupta | H04L 41/32 709/223 |
| 2016/0088000 | A1* | 3/2016 | Siva Kumar | H04L 63/083 726/23 |
| 2016/0306965 | A1* | 10/2016 | Iyer | G06Q 10/105 |
| 2017/0195434 | A1* | 7/2017 | Pitelka | H04L 67/18 |

FOREIGN PATENT DOCUMENTS

EP           2785078 A1     10/2014
WO    WO-2015174968 A1 *   11/2015  ............. G06F 21/00

OTHER PUBLICATIONS

"Bluetooth Smart Based Attendance Management System"—Lodha et al, International Conference on Advanced Computing Technologies and Applications, Mar. 2015 https://www.sciencedirect.com/science/article/pii/S1877050915003300 (Year: 2015).*

Lodha, et al., "Bluetooth Smart based Attendance Management System", in Journal Procedia Computer Science, vol. 45, Dec. 2015, pp. 524-527.

* cited by examiner

ESTABLISHING USER'S PRESENCE ON INTERNAL ON-PREMISES NETWORK OVER TIME USING NETWORK SIGNALS

BACKGROUND

Today corporate enterprises are interested in both security and utilization information. In other words, IT specialists have the need to locate and identify users and devices. However, it is not always possible to determine with certainty when a user has logged on and logged off. For example, it is possible for a hacker to alter an event log maintained on a user's device. It is also possible to manipulate the information within a data packet itself. Also, enterprise security systems sometimes require a software agent to be loaded on a user's device in order to allow the user's activity to be monitored. But, in this case, monitoring the activity is not performed passively and the event log is subject to being hacked. Although monitoring network activity to merely identify a user is known, what is needed is the ability to passively monitor networking traffic from the user to determine when a user is logged on and off as well as to determine how long the user has been logged on and been logged off. This could allow the enterprise to perform human resources (HR) and accounting functions with a higher degree of certainty.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

According to one aspect disclosed herein, a method is presented for determining a user's presence within an enterprise environment. The method disclosed herein includes collecting traffic to a network from a device and determining, over a period of time, login and logoff information of a user of the device from the collected network traffic. The method also includes determining a plurality of network sessions from the login and logoff information of the user of the device and then generating a timetable specific to the user that contains the plurality of network sessions logins and logoffs. The timetable can be used to identify when the user was active and when the user was not active based on the login and logoff information and to determine that the user was present at a particular location at a particular time.

According to another aspect disclosed herein, a system is presented for detecting a user's presence in an enterprise network that is comprised of a plurality of locations to which devices may access the network. The system disclosed herein includes a gateway operable to accept communications from the devices accessing the network, a domain controller, in communication with the gateway, operable to authenticate devices seeking to access the network, and a monitor, in communication with the domain controller, operable to aggregate connection information from the devices accessing the network and to collect traffic to the network from devices. In order to detect presence the monitor is further operable to determine, over a period of time, login and logoff information of a user of a device from the collected network traffic, determine a plurality of network sessions from the login and logoff information of the user of the device, generate a timetable specific to the user that contains the plurality of network sessions logins, wherein the timetable identifies when the user was active and when the user was not active based on the login and logoff information, and utilize the timetable to determine that the user of the device was present at a particular location at a particular time.

According to yet another aspect disclosed herein, a computer-readable storage medium including instructions for detecting presence of a user is disclosed. The instructions executed by a processor include passively collecting traffic to a network from a device and determining, over a period of time, login and logoff information of the user of the device from the collected network traffic. The instructions also include identifying when the user is actively on the network upon authenticating each login of the login information utilizing an authentication protocol and identifying types of logins within the login information to determine whether the user is actively on the network. The instructions further include determining a plurality of network sessions from the login and logoff information of the user of the device, generating a timetable specific to the user that contains the plurality of network session logins, wherein the timetable identifies when the user was active and when the user was not active based on the login and logoff information, and utilizing the timetable to determine that the user of the device was present at a particular location at a particular time and was present at another particular location at another particular time.

Examples are implemented as a computer process, a computing system, or as an computer program product for one or more computers. According to an aspect, the computer program product is a server of a computer system having a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
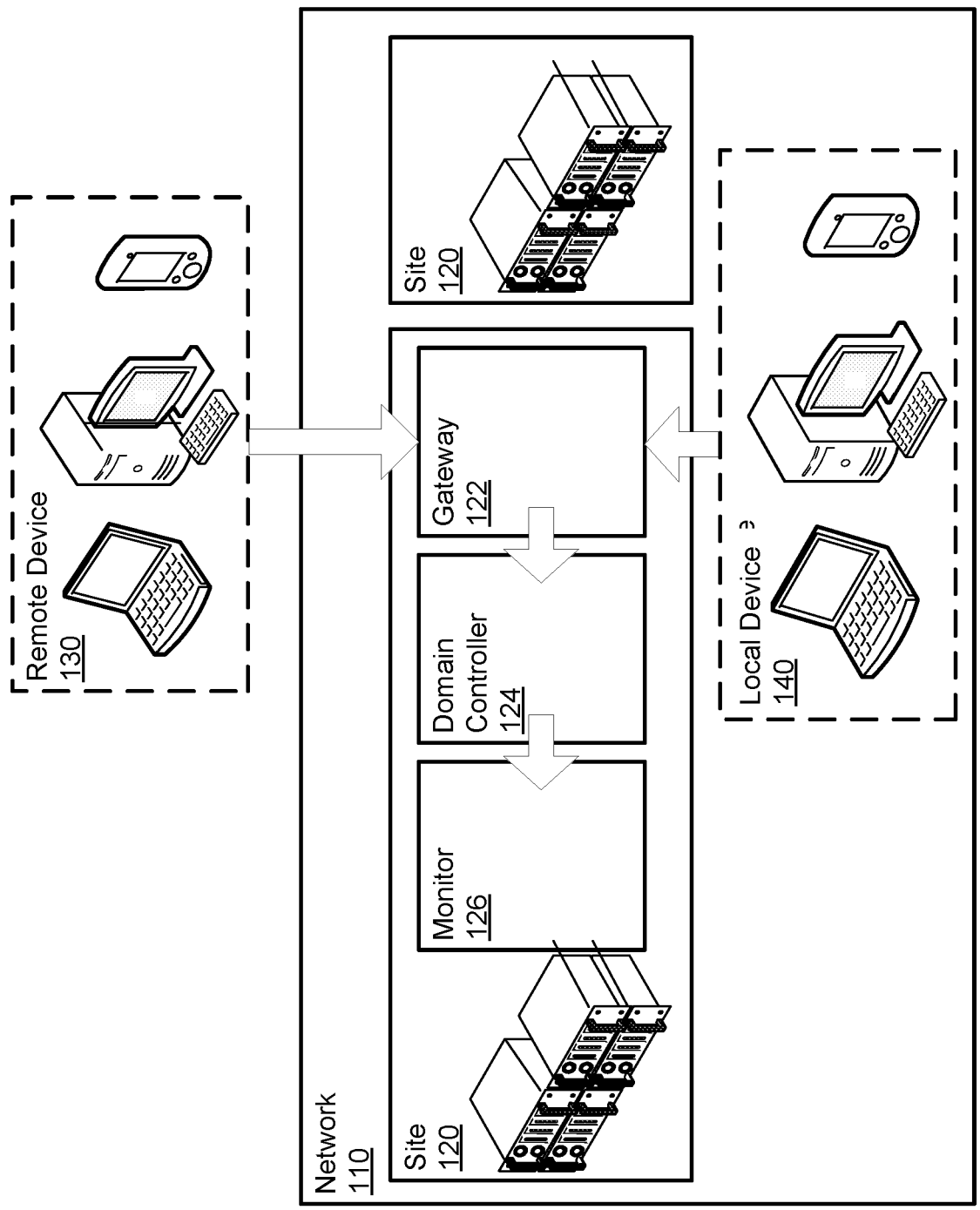
FIG. 1 illustrates an example environment having an enterprise network utilized in various aspects.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present invention are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

FIG. 1 illustrates an example computing environment 100 in which the present disclosure may be practiced. As illustrated, an enterprise such as enterprise network 110 is divided into multiple sites 120. A given site 120 may be accessed remotely by a remote device 130, which is located externally to the enterprise network 110 or remotely from the sites 120, or may be accessed locally by a local device 140, which is located internally to the enterprise network 110 or locally to the sites 120. Although two sites 120, one remote device 130, and one local device 140 are illustrated, the number of sites 120, remote devices 130, and local devices 140 may be greater than or less than what is illustrated in the example environment 100.

The enterprise network 110 provides a single operating environment over which computing devices may interact despite being spread across multiple sites 120 and domains (e.g., for a company, a governmental agency, an educational institution spread over a large geographical area). Each site 120 of the enterprise network 110 includes: a gateway 122, operable to accept communications from devices connecting to the site 120; a domain controller 124, which is in communication with the gateway 122 and operable to authenticate entities seeking to access the enterprise network 110; and a monitor 126, in communication with the domain controller 124, and operable to aggregate connection information from the remote devices 130 to manage entity location data. Gateways 122 and domain controllers 124 will be understood by one of skill in the art to include hardware devices and software running on those devices to provide the functionalities thereof. In various aspects, the monitor 126 may be run on dedicated hardware or may be provided via software on a computing device used for several purposes, such as, for example, on the same hardware as the domain controller 124. In additional aspects, the enterprise network 110 may make use of fewer monitors 126 than sites 120; some or all of the sites 120 may share a monitor 126.

The remote device 130 and local device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers.

Remote devices 130 and local device 140 are operated by users, who may be humans or automated systems (e.g., "bots") that request connections to one or more sites 120 of the enterprise network 110. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request a connection in response to or in anticipation of queries from a human user.

The remote device 130 and local devices 140 access the enterprise network 110 by being authenticated by a domain controller 124 of a site 120. Remote devices 130 may connect to a given site 120 via a Virtual Private Network (VPN) connection or other tunnel to initiate a session, whereas local devices 140 connect to the site 120 at which they are located. Whether a given device is a remote device 130 or a local device 140 depends on how it connects to the enterprise network 110, and a given device may be both a remote device 130 and a local device 140. For example, a user may use a local device 140 while in the office to connect locally to the enterprise network 110 and take that device home and log into the enterprise network 110, making the device a remote device 130 for the remote session. Entities (devices or user accounts) connect to a given site 120 which is then noted and mapped by either the domain controller 124 or the monitor 126 as using the given site 120.

The monitor 126 will observe the network address information from remote devices 130 connecting to the associated site 120 and will decide whether to store those addresses. Each time a user account successfully logs into the site 120 and establishes a session on the enterprise network 110, the monitor 126 may store the address information associated with the login request, or the monitor 126 may filter or restrict the number of logins from a given user account for a given time period for which to store the address information. For example, a user of a remote device 130 with an intermittent Wi-Fi signal may repeatedly gain and lose connection to the site 120, and may be forced to constantly re-authenticate with the domain controller 124, which the monitor 126 may choose to treat as multiple successful login attempts or as a single login attempt if the attempts fall within a given time range of one another (e.g., an hour, a day, a week). Alternatively, the monitor 126 may collect all of the address information and later filter it.

Local devices 140 may also have their connection attempts to the domain controller 124 and activity session logged by the monitor 126 for security purposes. As will be appreciated, local devices 140 are associated with IP addresses internal to the enterprise network 110, which may be masked for use within the enterprise network 110, and therefore may produce spurious results. The monitor 126 will note the entities associated with the login and session (e.g., the user account and devices), and will assign the location (calculated or physical) of the site 120 to the entity at the time of login. For example, a user account for a user entity or Media Access Control (MAC) address, serial number, etc., for a device entity may be tracked to determine whether a second login using the same entity identifiers occurring at a second time violates security rules.

In various aspects, the monitor 126 may store and use, store and filter, or exclude from storage connection attempts that were rejected by the domain controller 124 (e.g., an incorrect username or password were provided). Similarly, the monitor 126 may store and filter (or block from storage) connection attempts received from a list of addresses that are associated with blocked parties, unreliable geolocation, or whose duration or number of connections meet an unreliability threshold (e.g., multiple short connections may indicate an unstable connection, and may be filtered out or ignored). For example, a user making use of a VPN connection from a smartphone may have a signal routed through a cell-provider's network to reach the site 120, and the address of the cell-provider's network is provided to the monitor 126 instead of the remote device's 120 address internal to the cell-provider's network, making the address unreliable for geolocation, which may be flagged for the monitor 126 or noted over time by the monitor 126 as being unreliable based on the Internet Service Provider (ISP) frequently providing unreliable IP addresses.

Other configurations of computing environments such as a cloud-based environment having shared processing resources and data provided by server and computer resources as well as cloud storage 212 may also be used for providing users within the enterprise with various capabilities.

Still referring to the example on-premises computing environment 100 of FIG. 1, the gateway 122 operates to accept communications from the devices 130, 140 accessing the network 110. The domain controller 124 communicates with the gateway 122 to authenticate the devices 130, 140 seeking to access the network 110. The monitor 126, communicating with the domain controller 124, operates to aggregate connection information from the devices 130, 140 accessing the network 110. The monitor 126 passively collects traffic to the network 110 from the devices 130, 140. For example, in one or more aspects, all or part of the collected traffic may be tunneled traffic from remote device 130 connected via VPN or other tunnel where users are allowed access to network services. Software agents on the devices 130, 140 are not required to collect traffic and ascertain the login and logoff information.

The monitor 126 is further operable to determine, over a period of time, the login and logoff information of a user of a device 130, 140 from the collected network traffic. The period of time, for example, may be more than one session, over the course of a single day, or over multiple days. The monitor 126 also determines network sessions, which may occur over a single day or multiple days, from the login and logoff information of the user of a device 130, 140 and generates a timeline or timetable specific to the user that contains the network session logins. The timetable is generated based on when the packets associated with the login and logoff information are received and analyzed rather than what the information is that the packets contain. By analyzing the traffic of network packets the user identity can be determined along with which host the user was logging into. Upon determining how long the user was active in that host, a session or event may be assigned from which that particular user's presence may be determined.

Thus, the timetable identifies sessions when the user was active and when the user was otherwise not active based on the login and logoff information. The monitor 126 utilizes the timetable to determine whether the user of the device 130, 140 was present at a particular location at a particular time. The timetable may also be used to identify sessions when the user is present at other particular locations at other particular times based on login and logoff information. Also, the timetable may be used to identify when the user is not actively on the network 110.

In one or more aspects, a device 130, 140 may be tracked to determine whether a second login using the same entity identifiers occurring at a second time violates security rules.

Entities such as the remote device 130 and local devices 140 access the enterprise network 110 by being authenticated by the domain controller 124. Thus, the monitor 126 in communication with the domain controller 124 can identify when the user is actively on the network 110 upon authenticating each login pursuant to utilization of an authentication protocol. Thus, the monitor 126 can also identify when the user is not actively on the network 110 via the authentication process. Utilization of an authentication protocol can include protocols such as NT LAN Manager (NTLAM), Kerberos, Lightweight Directory Access Protocol (LDAP) and Network Time Protocol (NTP) or any other suitable authentication protocol. Thus, successful authentication of the logins generates and updates the timetable. Authentication packets via the authentication protocols can be correlated to determine whether the collected traffic came from a particular device.

The type of connection or the type of login is also useful in determine a user's presence and for generating the timetable. Identifying the types of logins within the login information can be used to determine whether the user is actively on the network. For example, an interactive login requires the user to enter credentials which evidences the user is actually logging into the device. On the other hand, logins other than interactive logins could lead to determining that the user is not actively on the network 110. For example, automatic or triggered logins or logins occurring as a result of a service should be distinguished in the timetable or not be included in the timetable. Determining if a login is a remote or local login can also be used to generate the timetable.

Figure 2:
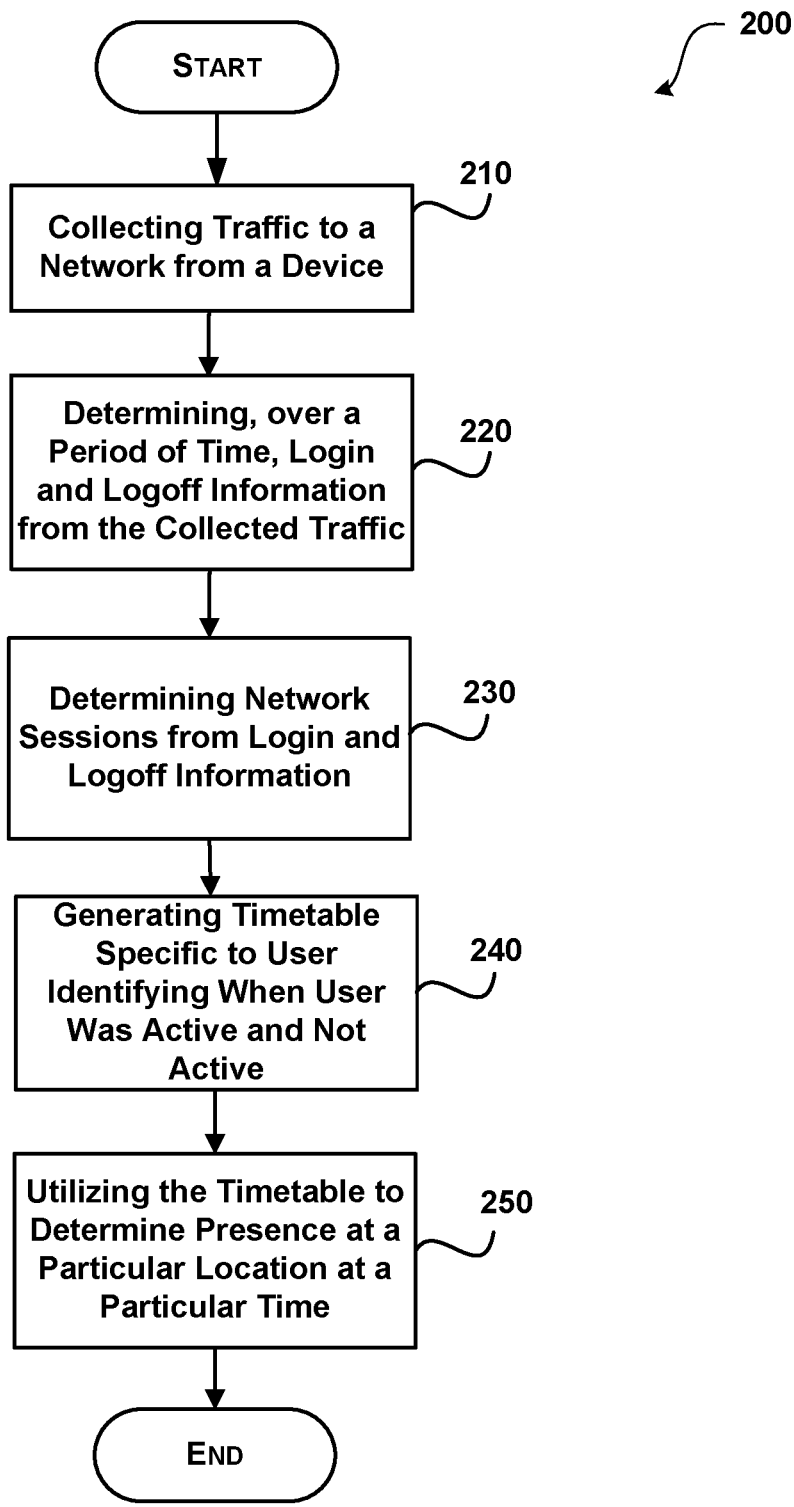
FIG. 2 illustrates a flowchart showing general stages involved in determining a user's presence within a network of an enterprise environment according to at least one aspect disclosed herein.

The use of the gateway 122, the domain controller, 124 and the monitor 126 as described above to determine a user's presence on a network also constitutes an inventive method. In practicing the method 200 for determining a user's presence on a network as illustrated in FIG. 2, the steps include process block 210 for collecting traffic to a network from a device. At process block 220 the method 200 includes determining, over a period of time, login and logoff information from the collected traffic. The method 200 also includes determining network sessions from the login and logoff information as shown in process block 230. Next, the method 200 includes process block 240 for generating a timetable specific to a user for identifying when the user is active and not active on the network and process block 250 for utilizing the timetable to determine that the user of a device was present at a particular location at a particular time. It is to be understood that additional operations may be performed between the process steps mentioned here or in addition to those steps.

Figure 3:
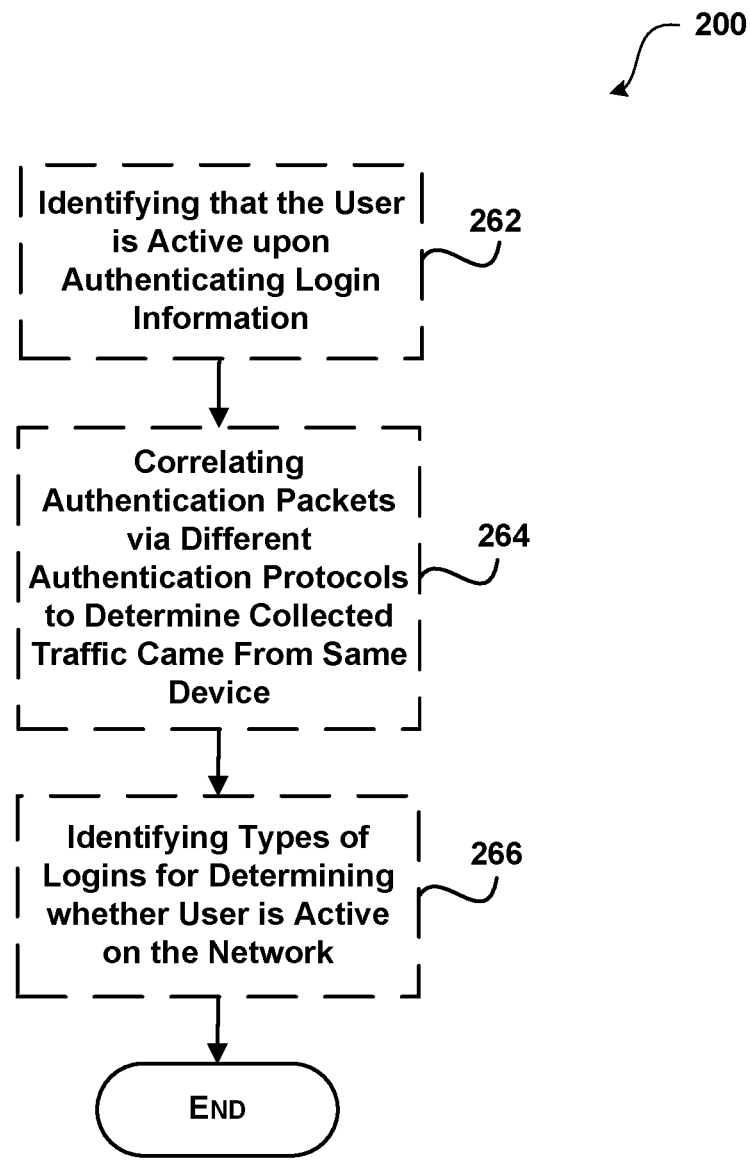
FIG. 3 illustrates optional stages to the flowchart of FIG. 2 for determining a user's presence within a network of an enterprise environment according to at least one aspect disclosed herein.

The method 200 may also include one or more of the optional steps shown in FIG. 3. The method 200 may include process block 262 for identifying that the user is active on the network upon authenticating login information based on an authentication protocol. The process 200 may also include process block 264 for correlating authentication packets via different authentication protocols in order to determine that at least a portion or all of the collected traffic came from the same device. The process 200 may also include process block 266 for identifying types of logins for determining whether the user is actively on the network.

Aspects, for example, are described above with reference to block diagrams and/or operational illustrations of methods, systems, and computer program products according to aspects. The functions/acts noted in the blocks may occur out of the order as shown in any flowchart or described herein with reference to the Figures. For example, two steps or processes shown or described in succession may in fact be executed substantially concurrently or the blocks may sometimes be executed in the reverse order, depending upon the functionality/acts involved.

Figure 4:
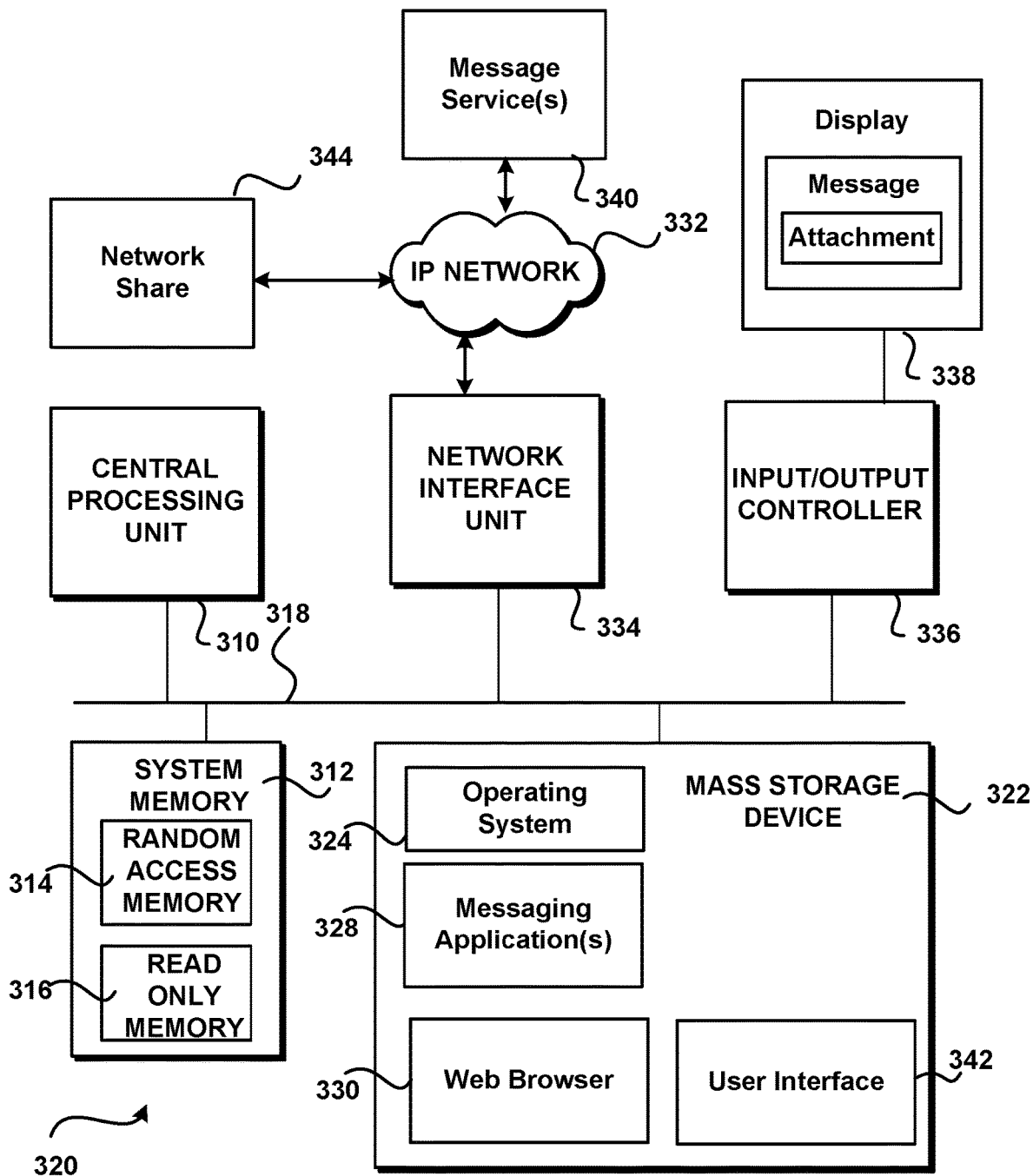
FIG. 4 illustrates an exemplary embodiment of physical components for a device/computer utilized in the various embodiments.

FIG. 4 and the corresponding discussion are intended to provide a brief, general description of a suitable computing environment in which embodiments may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Still referring to FIG. 4, an illustrative computer environment for a computer 320 utilized in the various embodiments will be described. The computer environment shown in FIG. 4 includes computing devices that each may be configured as a mobile computing device (e.g. phone, tablet, net book, laptop), server, a desktop, or some other type of computing device and include a central processing unit 310 ("CPU"), a system memory 312, including a random access memory 314 ("RAM") and a read-only memory ("ROM") 316, and a system bus 318 that couples the memory to the CPU 310.

A basic input/output system containing the basic routines that help to transfer information between elements within the computer, such as during startup, is stored in the ROM 316. The computer 320 further includes a mass storage device 322 for storing an operating system 324, attachment manager 326, messaging application 328 and web browser 330.

The mass storage device 322 is connected to the CPU 10 through a mass storage controller (not shown) connected to the bus 318. The mass storage device 322 and its associated computer-readable media provide non-volatile storage for the computer 320. Although the description of computer-readable media contained herein refers to a mass storage device, such as a hard disk or CD-ROM drive, the computer-readable media can be any available media that can be accessed by the computer 320.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 320.

Computer 320 operates in a networked environment using logical connections to remote computers through a network 332, such as the Internet. The computer 320 may connect to the network 332 through a network interface unit 334 connected to the bus 318. The network connection may be wireless and/or wired. The network interface unit 334 may also be utilized to connect to other types of networks and remote computer systems. The computer 320 may also include an input/output controller 336 for receiving and processing input from a number of other devices, including a keyboard, mouse, or electronic stylus (not shown). Similarly, the input/output controller 336 may provide input/output to a scanner, a camera, a display screen 338, a printer, or other type of input and/or output device. Display 338 is configured to display representations of the messages received via the messaging application 328.

As mentioned briefly above, a number of program modules and data files may be stored in the mass storage device 322 and RAM 314 of the computer 320, including an operating system 324 suitable for controlling the operation of a computer, such as the WINDOWS 10®, WINDOWS 10 Mobile®, or WINDOWS SERVER® operating system from MICROSOFT CORPORATION of Redmond, Wash. The mass storage device 322 and RAM 314 may also store one or more program modules. In particular, the mass storage device 322 and the RAM 314 may store one or more application programs, including one or messaging applications 328 and Web browser 330.

User interface 342 is used by a user to interact with applications and documents. Messaging application 328 may be one or more different messaging applications. For example, the computing device may include an email application, an Instant Messaging (IM) application, an SMS, MMS application, a real-time information network (e.g. Twitter® interface), a social networking application, and the like. According to an embodiment, messaging application 328 is an email application, such as MICROSOFT OUTLOOK®. The messaging application(s) may be client based and/or web based. For example, a network based message service 340 may be used, such as: MICROSOFT WINDOWS LIVE or some other network based email and messaging service.

Network share 344 is configured to store content (e.g. documents, spreadsheet, images, video, Web content, and the like) that are accessible to one or more users through IP network 318. For example, network share 344 may store content that is accessible by users located at one or more locations.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for determining presence of a user on a network, comprising:
   collecting traffic to a network from a device of a user;
   determining, over a period of time, network login and logoff information of the user of the device from the collected traffic;
   identifying a type of login for each login in the network login and logoff information;
   determining a plurality of network sessions from the network login and logoff information, the plurality of network sessions corresponding to time periods between a respective network login and a respective network logoff of the user of the device;
   determining, from the network login and logoff information, a location of the user associated with each of the plurality of network sessions;
   generating a timetable specific to the user that indicates the plurality of network sessions,
   wherein, for each of the plurality of network sessions, the timetable identifies the corresponding time period, the location of the user, whether the user was active or not active, and the type of login for each login, and
   wherein, for each of the plurality of network sessions, the identified type of login being an automatic login indicates that the user was not active; and
   utilizing each of the time period, the location of the user, and the type of login of the timetable to determine that the user of the device was present at a particular location at a particular time.

2. The method of claim 1 wherein collecting traffic to the network is performed in an on-premises environment and comprises collecting tunneled traffic.

3. The method of claim 1 further comprising determining a likelihood that the user logged into the device at one location in view of receiving login information that the user logged into the device at another location.

4. The method of claim 1 further comprising identifying when the user is actively on the network upon authenticating each login of the network login information utilizing an authentication protocol.

5. The method of claim 4 wherein utilizing an authentication protocol comprises utilizing at least one of an authentication protocol selected from the group consisting of:
   NT LAN Manager (NTLM);
   Kerberos;
   Lightweight Directory Access Protocol (LDAP); and
   Network Time Protocol (NTP).

6. The method of claim 4 further comprising determining if each login is a remote login, an interactive login or a login associated with a service upon authenticating each login of the login information utilizing an authentication protocol.

7. The method of claim 1 further comprising identifying when the user is not actively on the network by utilizing an authentication protocol.

8. The method of claim 1 further comprising identifying types of logins in the network login information to determine whether the user is actively on the network.

9. The method of claim 1 wherein determining the network login information comprises determining at least one login that is other than an interactive login requiring the user to enter credentials and, as a result, determining that the user is not actively on the network.

10. The method of claim 1 wherein the period of time corresponds with multiple days.

11. The method of claim 10 wherein determining a plurality of network sessions comprises determining a plurality of network sessions over the multiple days.

12. The method of claim 1 further comprising utilizing the timetable to determine that the user of the device was present at another particular location at another particular time.

13. The method of claim 1, further comprising:
    identifying when the user is actively on the network by authenticating each login in the network login and logoff information utilizing an authentication protocol that is included among the different authentication protocols that are used to determine that the collected traffic came from the device of the user.

14. A system to detect presence of a user in an enterprise network, the system comprising:
    a gateway accepting communications from devices accessing the enterprise network;
    a domain controller, in communication with the gateway, authenticating the devices seeking to access the enterprise network; and
    a monitor, in communication with the domain controller, aggregating connection information from the devices accessing the enterprise network and collecting traffic to the enterprise network from the devices, and wherein to detect presence, the monitor is operable to:
    determine, over a period of time, network login and logoff information of the user from the collected traffic;
    identify a type of login for each login in the network login and logoff information;
    determine a plurality of network sessions from the network login and logoff information, the plurality of network sessions corresponding to time periods between a respective network login and a respective network logoff of the user;
    determine, from the network login and logoff information, a location of the user associated with each of the plurality of network sessions;
    generate a timetable specific to the user that indicates the plurality of network sessions,
    wherein, for each of the plurality of network sessions, the timetable identifies the corresponding time period, the location of the user, whether the user was active or was not active, and the type of login for each login, and
    wherein, for each of the plurality of network sessions, the identified type of login being an automatic login indicates that the user was not active; and
    utilize each of the time period, the location of the user, and the type of login of the timetable to determine that the user was present at a particular location at a particular time.

15. The system of claim 14 wherein the monitor identifies when the user is actively on the network upon authenticating each login of the network login information utilizing an authentication protocol.

16. The system of claim 14 wherein the monitor identifies types of logins in the network login information to determine whether the user is actively on the network.

17. The system of claim 14, wherein the monitor is operable to:
    determine a login that corresponds to a session and that is not an interactive login, which requires the user to enter a credential; and as a result of the login not being an interactive login, determine that the user is not actively on the network during the session.

18. The system of claim 14 wherein the monitor collects the traffic to the enterprise network from the devices in an on-premises environment; and
wherein the monitor collects tunneled traffic, which is included in the traffic to the enterprise network, from a device of the user via a virtual private network.

19. A hardware-implemented computer-readable storage medium including instructions for detecting presence of a user, which when executed by a processor are operable to:
passively collect traffic to a network from a device;
determine, over a period of time, network login and logoff information of a user of the device from the collected traffic;
identify when the user is actively on the network upon authenticating each login of the login information utilizing an authentication protocol;
identify a type of login for each login in the network login information;
determine a plurality of network sessions from the network login and logoff information, the plurality of network sessions corresponding to time periods between a respective network login and a respective network logoff of the user of the device;
determine, from the network login and logoff information, a location of the user associated with each of the plurality of network sessions;
generate a timetable specific to the user that indicates the plurality of network sessions,
wherein, for each of the plurality of network sessions, the timetable identifies the corresponding time period, the location of the user, whether the user was active or not active, and the type of login for each login, and
wherein, for each of the plurality of network sessions, the identified type of login being an automatic login indicates that the user was not active; and
utilize each of the time period, the location of the user, and the type of login of the timetable to determine that the user of the device was present at a particular location at a particular time and was present at another particular location at another particular time.

20. The hardware-implemented computer-readable storage medium of claim 19, wherein, for each of the plurality of network sessions, whether the user was active or not active depends on whether the user was required to enter a credential.

* * * * *